United States Patent
Elliott et al.

(10) Patent No.: US 7,423,995 B1
(45) Date of Patent: Sep. 9, 2008

(54) CRITERIA FOR TEARING DOWN NETWORK LINKS

(75) Inventors: Brig Barnum Elliott, Arlington, MA (US); Joseph Jacob Weinstein, Somerville, MA (US)

(73) Assignee: BBN Technologies Corp., Cambridge, MA (US)

( * ) Notice: Subject to any disclaimer, the term of this patent is extended or adjusted under 35 U.S.C. 154(b) by 1033 days.

(21) Appl. No.: 10/351,625

(22) Filed: Jan. 24, 2003

Related U.S. Application Data

(60) Provisional application No. 60/352,367, filed on Jan. 28, 2002.

(51) Int. Cl.
*H04Q 7/20* (2006.01)
*H04Q 7/00* (2006.01)
*H04Q 7/24* (2006.01)
*H03C 1/62* (2006.01)
*H04B 17/02* (2006.01)
*H04L 12/28* (2006.01)

(52) U.S. Cl. .................. 370/332; 370/329; 370/338; 370/395.21; 455/115.3; 455/452.2; 455/455

(58) Field of Classification Search ........ 370/216, 370/225, 227, 228, 242, 244, 241, 252, 395.21, 370/468, 238, 332, 328, 329, 341, 395.4, 370/400, 338; 455/452.2, 455, 115.3, 135, 455/134
See application file for complete search history.

(56) References Cited

U.S. PATENT DOCUMENTS 5,649,108 A * 7/1997 Spiegel et al. ............. 709/241
6,778,502 B2 * 8/2004 Ricciulli .................... 370/238
7,130,262 B1 * 10/2006 Cortez et al. ............... 370/216
7,165,102 B2 * 1/2007 Shah et al. ................. 709/223
7,168,044 B1 * 1/2007 Mao .......................... 715/736

OTHER PUBLICATIONS

Perlman, Radia. *Interconnections: Bridges, Routers, Switches and Internetworking Protocols* (Second Edition). Chaps. 10, 12, 14, 16, 17 and 18. Addison Wesley, 2000.

Floyd, S., and Jackson, V., *Random Early Detection gateways for Congestion Avoidance.* V.1 N.4, Aug. 1993, p. 397-413. Abstract.

Braden B., Clark, D., Crowcroft, J., Davie, B., Deering, S., Estrin, D., Floyd, S., Jacobson, V., Minshall, G., Partridge, C., Peterson, L., Ramakrishnan, K., Shenker, S., Wroclawski, J., Zhang, L. *Recommendations on Queue Management and Congestion Avoidance in the Internet.* Apr. 1998.

Floyd, S., and Fall, K. *Promoting the Use of End-to-End Congestion Control in the Internet.* IEEE/ACM Transactions on Networking, vol. 7, No. 4, Aug. 1999.

(Continued)

*Primary Examiner*—Hanh Nguyen
(74) *Attorney, Agent, or Firm*—Ropes & Gray LLP

(57) ABSTRACT

The present invention, which may be embodied in or carried out by various components of a data communications network, provides an improved criterion for tearing down network links. The invention allows network components to take into account the quality, status and performance of other network links, as well as the overall performance of the network, when deciding whether to remove a failing network from service.

8 Claims, 6 Drawing Sheets

OTHER PUBLICATIONS

Elloumi, O., and Afifi, H., *RED Algorithm in ATM Networks*. IEEE Tech Report, Jun. 1997.

Lin, D. and Morris, R., *Dynamics of Random Early Detection*. Proceedings of SIGCOMM '97. Sep. 1997.

Feng, W., Kandlur, D.,Saha, D., Shin, K., *Techniques for Eliminating Packet Loss in Congested TCP/IP Networks*, U. Michigan CSE-TR-349-97, Nov. 1997.

Jacobson, V., *Notes on using RED for Queue Management and Congestion Avoidance*. Nanog 13 Viewgraphs. Dearborn, MI, Jun. 1998.

Rosolen, V., Bonaventure. O., and Leduc, G. *A RED Discard Strategy for ATM Networks and its Performance Evaluation with TCP/IP Traffic*, Proceedings of the 6th Workshop on Performance Modelling and Evaluation of ATM Networks (IFIP ATM'98) Ilkley, UK, Jul. 1998.

Cisco IOS Software Releases 12.2: Configuring Weighted Random Early Detection, URL: http://www.cisco.com/univercd/cc/td/doc/products/software/ios122/122cgcr/fqos_c/fqcprt3/qcfwred.pdf, Printed Jan. 10, 2003.

* cited by examiner

CRITERIA FOR TEARING DOWN NETWORK LINKS

RELATED APPLICATIONS

This application claims priority under 35 U.S.C. § 119 to provisional application No. 60/352,367, filed Jan. 28, 2002, the entirety of which is incorporated herein by reference.

BACKGROUND OF THE INVENTION

1. Field of Art

The present invention relates generally to the field of data communications networks, and more particularly to systems and methods employed in data communications networks for determining whether, when and how individual links in the network should be removed from service (torn down). The invention may be employed in or with any number of systems and devices found in a variety of different types of data communications networks, including, for example, the network routers, gateways, servers, intelligent relays and switches that form the infrastructure and backbone of the Internet, of private wide area networks (WANs), and local area networks (LANs), telephone switching systems, wireless data communications networks, optical networks, microwave or satellite communications systems.

2. Related Art

In the data communications industry, various methods and systems have been introduced to determine when an active network link should be torn down. Such tear-downs are necessary in order to remove faulty or failing links from a network so that traffic is not steered across links that are unlikely to be able to successfully deliver the traffic. For example, data communications networks based on Synchronous Optical Network (SONET) protocol typically employ special fields within the SONET frame that allow the routers and switches to determine when a link in the network is failing or is about to fail. In such cases, the routers or switches affected by the failure are normally configured to tear down the failing link and use an alternative path. This technique is sometimes referred to as "automatic fail over."

In data communications networks based on the Internet Protocol (IP), neighboring routing and switching devices often exchange "hello" messages in order to test the network links that connect them together. A failure to receive or acknowledge a certain percentage of these messages often causes a given router to tear down the network link that failed to deliver the messages. Routers and switches in such IP networks may be configured, for instance, to tear down a network link unless K of the most recent N "hello" messages has been successfully received. Thus, a system might require that at least 9 of the most recent 10 messages must have been received, or at least 3 of the last 5. A router or switch thus monitors the reception rate of the hello messages, and automatically tears down a link when these criteria are not met.

There are significant disadvantages to using such schemes to determine when network links should be torn down. These schemes almost always remove failing network links from service based solely on the status and/or performance of that failing link, without taking into account the status and/or performance of other links or groups of links in the network, or the role the failing network link currently plays in the overall operation and performance of the network as a whole. Unfortunately, tearing down failing network links without taking into account what is happening in the immediate vicinity of the failing link or elsewhere in the network often causes more problems than would have occurred if the failing network link had been left in service.

For example, even though a particular link may be exhibiting signs of current or impending failure (in terms of the link's speed, quality, security level or cost, for instance), the failing link may be the only link in the network connecting two particular nodes or two sub-networks in the overall network. Thus, tearing down that particular link may partition the network into two or more sub-sections that can no longer communicate with each other, which is a situation usually considered to be much worse than continuing to use the failing link. Even if the failing link is not the only remaining link between two network segments, it may still be better to keep the failing link in service if there are relatively few alternative links in service or if the failing link is still playing a valuable role in the overall performance of the network.

Suppose, for example, that in addition to the failing network link, all links in the network (or a substantial number of them) are also underperforming or malfunctioning. This situation often occurs in radio frequency networks during periods of intense external interference from manmade sources or natural phenomena, such as a severe electrical storm. Systems utilizing conventional network link teardown algorithms, which blindly remove links from service based solely on the status or performance of each link will eventually tear down every link in the network experiencing the interference, even though it might be more vastly more desirable to continue using the links, albeit at a lower quality, slower speed, higher cost or lower level of security.

Accordingly, there is a need for systems and methods that consider the status and performance of other links in the network, as well as the role a failing link is playing in overall network performance, when determining whether, when and how failing links should be removed from service. The present invention addresses such a need.

SUMMARY OF INVENTION

The present invention significantly improves the way failing network links in data communications networks are taken out of service or torn down. In one aspect of the invention, for example, an improved data communications network is provided, which comprises a set of network links, a computer-readable storage medium having stored thereon a group of quality ratings, wherein each quality rating in the group of quality ratings is associated with a network link in a subset of the set of network links. The data communications network also includes a processor (such as a computer, a computer program, a microprocessor, or some combination of each) configured to determine whether a failing network link in the subset of network links should remain in service based on both the quality rating associated with the failing network link and at least one other quality rating in the group of quality ratings stored on the computer-readable storage medium. In addition to determining whether the network link should remain in service, the processor in the data communications network of the present invention may be further configured to actually remove the network link from service, or, alternatively, to pass data or instructions to another computer, computer program or processor configured to remove the link from service.

The term "network link" refers to the wires, cables, telephone lines, transmitters, receivers, electromagnetic and audio signals, switches, software programs and other components typically used to carry data transmissions between nodes in both wired and wireless data communications networks.

The term "quality rating" refers to any measure or characteristic of the network link that may be used by the processor to determine whether the link should remain in service or be torn down. A network link with a higher quality rating (i.e., "very good") is more likely to be designated by the processor as a network link that should remain in service. On the other hand, a link with a lower quality rating (i.e., "failing") is more likely to be designated by the processor as a network link that should be taken out of service (torn down).

The computer-readable storage medium containing the group of quality ratings may comprise a computer memory (e.g., a disk drive or random access memory area) or other storage device (e.g., a CD-ROM, DVD-ROM or tape drive), configured to hold quality rating values in some organized and retrievable fashion. In preferred embodiments, the quality ratings would be stored in a suitable data structure or series of data structures, such as a database. The database may be centralized at one node in the network, or dispersed among a plurality of nodes. Thus, each node in the network may have its own database, where it stores the quality ratings for the subset of network links that are directly connected to that node. Alternatively, a data communications network embodying the present invention may be configured so that each node in the network stores a copy of a data structure or database containing the current quality ratings for all of the links in the network, or the current quality ratings for an appropriate subset of all of the links in the network.

In some embodiments, each quality rating in the group of quality ratings may be determined based on a count of attempts to transmit a message over the network link to which the quality rating is associated. Thus, the quality rating for a particular network link may depend, for example, on the number of messages successfully transmitted over the network link, and/or the number of attempted messages that failed to be transmitted over the network link, or a ratio of successful to unsuccessful attempts to transmit a message over the network link.

The actual value of the quality rating may comprise, for example, a number, a Boolean value or a string of characters, depending on the type of information the quality rating is designed to convey, as well as the complexity and operating requirements of the particular link teardown processor or algorithm used to make the link teardown decisions. In some embodiments, for example, the quality rating may comprise a Boolean value, which could be used to convey whether the corresponding network link is congested, unstable or unsecure. In other embodiments, the quality rating may comprise a number, which may be better suited than a Boolean value to represent an actual or estimated amount of congestion, stability or security associated with the failing network link. The value of the quality rating may even be bit-field encoded with numbers and/or characters to represent one or more useful combinations of relevant quality characteristics for the link, including, but not limited to, its speed, cost, congestion level, stability level and security level.

The present invention may be embodied in a network routing device (such as a switch or router) for use in a data communications network. Thus, a network routing device according to the present invention comprises a computer-readable storage medium containing a group of quality ratings, each quality rating in the group being associated with one network link in a subset of network links in the data communications network, and a processor configured to determine whether a failing network link in the subset of network links should remain in service based on both a quality rating associated with the failing network link and a quality rating associated with at least one other quality rating in the group of quality ratings. The processor may be further configured to remove the failing network link from service, and the subset of network links may include all of the links in the data communications network, all of the links attached to a specified node, or all of the links in a minimal cut set of network links.

In another aspect of the invention, a computer-readable storage medium for use in a data communications network is provided. The computer-readable storage medium contains a data structure comprising a link identifier field configured to identify a network link; and a link quality field configured to specify a quality rating for the identified network link. In addition to the quality rating, the storage medium of this invention may optionally include fields for storing source node identifiers, link counts, and link metrics associated with the network link, all of which are described in more detail below.

In still another aspect of the invention, a method of removing network links from service is provided. The method comprises the steps of: (1) providing a group of quality ratings, each quality rating in the group of quality ratings being associated with a network link in a subset of network links in the data communications network; and (2) removing an individual network link from service based on both a quality rating associated with the individual network link and a status associated with at least one other network link in the subset of network links. Although the "status" associated with the at least one other network link may also comprise a quality rating for the link, it can also represent some other property, characteristic or condition pertaining to the link that is distinguishable from its quality rating. For instance, if the quality rating for a network link is determined by measuring the average number of packets dropped by the link, then the status preferably indicates some other significant property or characteristic of the link, such as its cost, security level, stability level, age, location, or some other significant property or characteristic that is not the average packet-loss rate. On the other hand, if the quality rating is defined to be a measure of a link's security level (in terms of encryption capacity, for example), then it may be useful to incorporate the links packet-loss rate into the status field. Among other things, the status could also be used to indicate whether the link is out of service, whether it passes through a certain territory, whether it is connected to a certain node or set of nodes in the network, or whether it is a member of a specified group of network links, such as a minimal cut set.

In yet another aspect of the invention, a data communications network for carrying out the above-described method is presented. The data communications network comprises a source node, a destination node, a set of network links capable of carrying data traffic traveling from the source node to the destination node, a group of memory storage areas, each containing a status associated with a network link in the data communications network, and a processor configured to determine whether a failing network link in the subset of network links should remain in service based on both a quality rating associated with the failing network link and at least one status in the group of memory storage areas. Alternatively, the determination may be based on the statuses of all of the other links in the network.

In still another aspect of the invention, the method of removing network links from a data communications network comprises the steps of: (1) providing a group of quality ratings, wherein each quality rating in the group is associated with a network link in a subset of the set of network links; (2) providing a group of statuses, wherein each status in the group is associated with a network link in the subset of network links; (3) comparing a quality rating associated with an individual network link in the subset of network links to a specified threshold; and (4) removing the individual network link from service if (a) the quality rating associated with the individual network link is less than the specified threshold, and (b) a specified condition is false based on a comparison of the status associated with the individual network link to the status associated with at least one other network link in the subset of network links.

In this aspect of the invention, the specified condition will be false, and the individual network link will be removed from service, for example, if the comparison of the status of the individual network link with the status of the other network links shows that the individual network link is not the only network link in the subset of network links capable of transmitting data to or from a specified node in the data communications network. The specified condition may also be false when the individual network link is not one of a specified minimum number network links in the subset of network links capable of transmitting data to or from a specified node in the data communications network. The specified condition may also be false when the individual network link is not the only network link in the subset of network links capable of transmitting data to or from a specified node in the data communications network with a specified speed, a specified cost, or a specified level of security or stability.

Finally, in still another aspect of the present invention, the method may comprise the steps of (1) providing a group of quality ratings, wherein each quality rating in the group is associated with a network link in a subset of the set of network links; (2) comparing a quality rating associated with each network link in the subset of network links to a specified threshold; (3) determining a minimal cut set for the data communications network, wherein the minimal cut set comprises the smallest number of network links in the subset of network links, which if removed from the data communications network at the same time, would partition the data communications network; (4) determining whether the individual network link is a member of the minimal cut set; and (5) removing an individual network link from service if (a) the quality rating associated with the individual network link is less than the specified threshold, and (b) the quality rating associated with at least one other network link in the minimal cut set of network links is greater than the specified threshold.

Unlike conventional systems, the systems, methods and devices of the present invention take the into account the quality ratings associated with other links in the network before deciding whether the failing network link should remain in service. It will be appreciated by those skilled in the art that the processor of the claimed invention may alternatively be configured to determine whether the failing network link should be removed from service (as opposed to determining whether it should remain in service) without departing from the design and scope of the claimed invention.

In some situations, e.g., those situations where the overall performance of the entire network is an important factor, it might be appropriate or necessary to consider all of the quality ratings for all of the links in the network before taking down the failing network link. In other situations, the quality ratings for only a subset of the entire set of network links may need to be considered. The subset of network links may comprise, for example, those network links that are directly attached to a particular node or a particular group of nodes in the data communications network. The subset of network links may also comprise a "minimal cut set" of network links, which is the smallest number of network links, which, if they were all removed from the data communications network at the same time, would partition the data communications network into two or more separate networks incapable of communicating with each other. Accordingly, the present invention may be configured and/or programmed to utilize only one other network link quality rating, all of the other network link quality ratings, or any number of network link quality ratings in between.

FEATURES AND ADVANTAGES OF THE PRESENT INVENTION

It is a feature of the present invention that it takes into account the quality ratings and/or statuses of other network links in the data communications network when making decisions on whether failing network links should be removed from, or remain in, service.

It is a further feature of the present invention that it can be configured to take into account the quality ratings and/or statuses of all of the other links in the network, thereby factoring the overall network performance into the link teardown decision for each network link.

Data communications networks and devices embodying or practicing the present invention have important advantages over conventional systems in that they significantly reduce the risk that taking a particular network link out of service will aggravate overall network performance rather than improve it.

Additional features and advantages of the present invention are set forth in part in the description that follows, and in part are apparent from the description, or may be learned by practice of the invention. The features and advantages of the invention may also be realized and attained by means of the instrumentalities and combinations particularly set out in the appended claims.

DETAILED DESCRIPTION OF THE PREFERRED EMBODIMENTS

Figure 1:
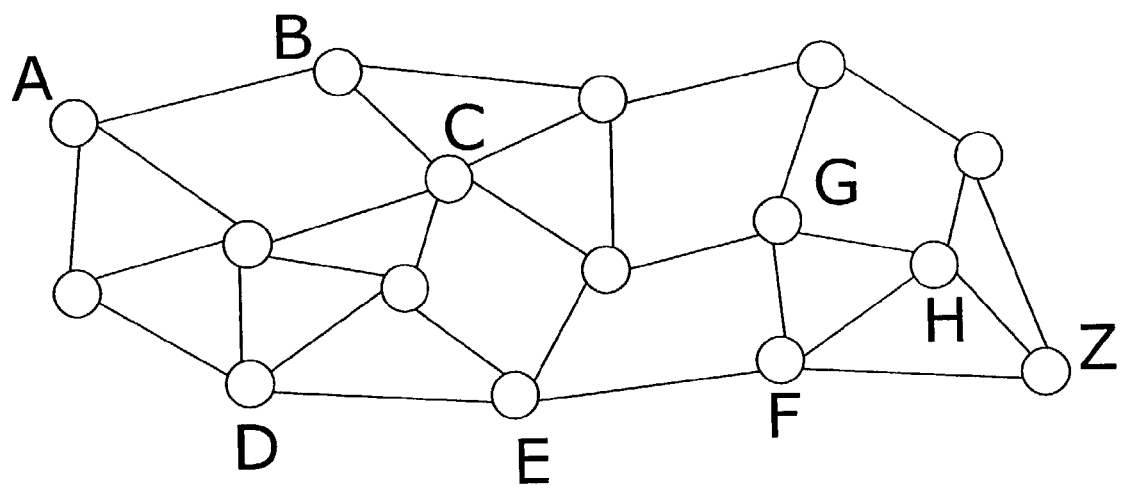
FIG. 1 shows a graphical representation of a data communications network.

With reference now to the figures, a detailed discussion of embodiments of the present invention is presented. Notably, the present invention may be implemented using software, hardware or any combination thereof, as would be apparent to those of skill in the art. The figures and examples below are not meant to limit the scope of the present invention or its embodiments or equivalents.

Data communications networks are typically comprised of a set of nodes (e.g., host computers, routers and/or switches) connected by a set of network links (e.g., wires, cable, fiber, microwave or radio wave channels, etc.). In a data communications network, a node is a connection point, either a redistribution point or an end point, for data transmissions. In general, a node (especially if the node is a switch or router) has a programmed or engineered capability to recognize, process and/or forward data traffic to other nodes via the network links connecting the nodes.

A "router" is a device or, in some cases, software in a computer, that determines the next connection point to which a packet of data should be forwarded toward its final destination. A router is connected to at least two network links and determines which link should be used to send each data packet to its next destination based on its current understanding of the state of the network links to which it is connected. A router may be located at any network gateway (where one network meets another), including, for example, host computers and points-of-presence on the Internet. Put another way, a router is a device or program that determines the route and specifically to which adjacent connection point in a network a data packet should be sent. A router may create or maintain a table of available routes and their conditions and use the information in this routing table, along with distance and cost algorithms, to determine the best route for a given data packet.

A router is often included as part of a network "switch," which is also a network device that selects a path or circuit for sending a packet of data to its next destination. In general, however, a switch is a simpler and faster mechanism than a router. Routers and switches may both be configured to implement schemes to monitor and control the network links used to transmit data packets to their destinations, as well as the order and speed in which data or data packets flow over the network links. However, switches are generally less sophisticated than routers in terms of the algorithms and the quantity and quality of network information it uses to make decisions about the performance and status of connected network links.

For purposes of this specification, as well as the claims that follow, the term "network routing device" means a router, a switch, or a computer or computer program configured to perform the functions of a router or switch, and/or any other piece of networking equipment or apparatus having all or part of the functionality typically found in a network router or switch.

Often the links in a data communications network are "weighted" or assigned numeric values to reflect some functional, qualitative or quantitative aspect of each link, such as its capacity to transmit data traffic. These numeric values are often called link metrics. Conventional routers and switches use algorithms based on link metrics to determine the "best path" to send a data packet to its intended destination. Several well-known protocols, such as Open Shortest Path First Routing (sometimes called link-state routing), or Distance Vector Routing, and their many variants, for example, have been advantageously applied in the data communications industry to optimize routing of data traffic through data communications networks.

Some types of secure networks employ a technique called "link encryption." Link encryption (also called "link level encryption" or "link layer encryption") is a data security process for encrypting information at the data link level as it is transmitted between two points within a data communications network. In such networks, a data packet is considered to exist "in the clear" while it is still located in a first network routing device's memory. The data packet is encrypted before it is sent across the link from this first network routing device to a second network routing device, and then is decrypted as it is received at the second network routing device. It is again considered to be "in the clear" when it arrives in an unencrypted state in the second network routing device's memory. A given data packet may thus proceed hop by hop through the data communications network, being encrypted before it is sent across each link, and then decrypted after it is received from that link.

Cryptographic devices and/or algorithms, known as "cryptos", generally perform the actual link encryption and decryption of the data. Link encryption typically requires a pair of collaborating cryptos—one at each end of a link—sharing a secret encryption "key." An encryption key typically comprises a variable value that is applied (according to an algorithm usually) to a string or block of unencrypted data to produce encrypted data, or applied to a string or block of encrypted data to produce unencrypted data. Cryptos may reside in one or more network routing devices in a data communications network, or elsewhere in the network as stand-alone devices, computers or computer programs.

FIG. 1 shows a diagram of a data communications network. The circles represent nodes (e.g, host computers, routers and/or switches), and the lines connecting the circles represent the network links that carry data traffic between these nodes. Note that the actual communications links may be implemented by a wide variety of technologies, e.g., fiber optic cabling, light through free space, radio waves, copper wires, etc. Note further that network traffic passes through a series of nodes and links as it proceeds from a source node to a destination node. For instance, data traffic traveling from node A to node Z might first travel to node B, then to node C, and so on, hop by hop, until it reaches the final destination of node Z.

Figure 2:
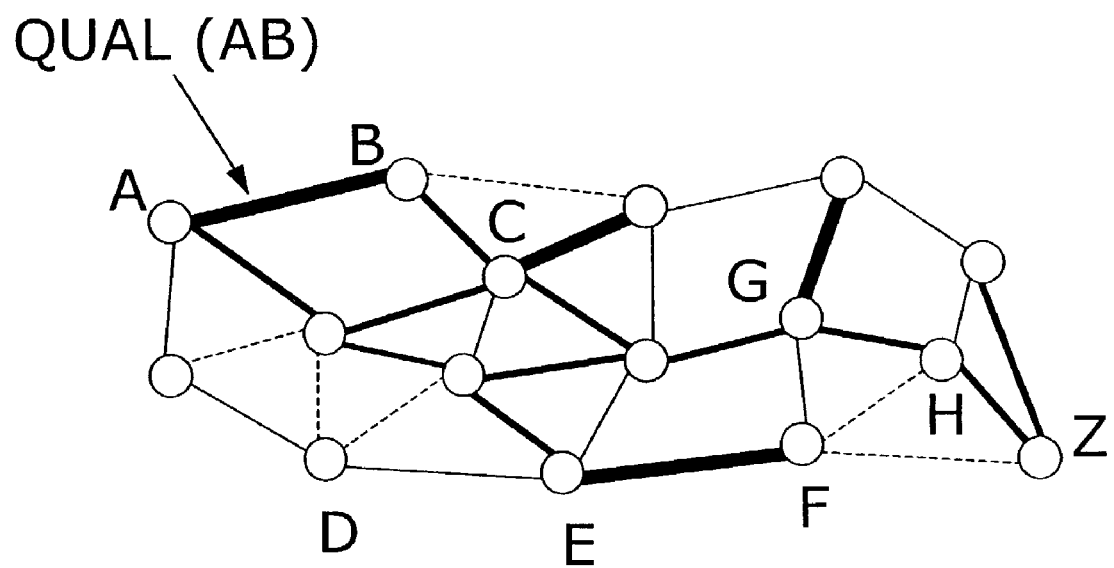
FIG. 2 shows the data communications network depicted in FIG. 1, but the network links connecting the nodes have been highlighted to indicate various levels of quality associated with each network link.

FIG. 2 illustrates how various links in the data communications network may have different "qualities" or quality ratings. As stated above, qualities and quality ratings are used by the network link teardown processor (or link teardown subsystem in some cases) to determine whether a link should remain in service or should be torn down. Suppose, for example, a conventional K of N algorithm is employed to determine when a link should be torn down, where N equals the number of "hello" message transmissions attempted and K equals the minimum number of messages that must be successfully transmitted in order for the link to avoid being torn down. Thus, the system may be configured to take the link out of service when K<5, i.e., when less than 5 of the previous 10 "hello" messages have been properly received.

The present invention improves the conventional algorithm by keeping track of these K values for each network link, and assigning a "quality rating" based on these values. For instance, the quality rating could be assigned a character string of "very good," which might equate to K=10, "good," which may equate to a K value in the range of 8 or 9, "acceptable," which may equate to the range 5 to 7, or "failing," which may equate to K<5.

Note, however, that numerous other techniques may be employed for assigning link qualities without departing from the scope of the invention. For example, the actual value of the quality rating does not have to comprise a character string. Instead, the quality rating may comprise, for example, a number or a Boolean value, depending on the type of information the quality rating is designed to convey, as well as the complexity and operating requirements of the particular link teardown processor or algorithm used to make the link teardown decisions. The quality rating may comprise a Boolean value to convey whether the corresponding network link is congested, unstable or insecure. Alternatively, the quality rating may comprise a number, which would be better suited than a Boolean value to represent an actual or estimated amount of congestion, stability or security associated with the failing network link. The value of the quality rating can even be bit-field encoded with numbers and/or characters to represent one or more useful combinations of relevant quality characteristics for the link, including, but not limited to, its speed, cost, congestion level, stability level and security level.

In general, the quality rating associated with one link in a data communications network will have little or no relationship to the quality ratings associated with other links in the same network, because, more often than not, the quality rating for a particular link depends mostly on situations or circumstances that only affect a particular link, such as a failing network interface card or a cut cable. Thus, quality ratings for multiple network links tend to be independent from each other.

Figure 3:
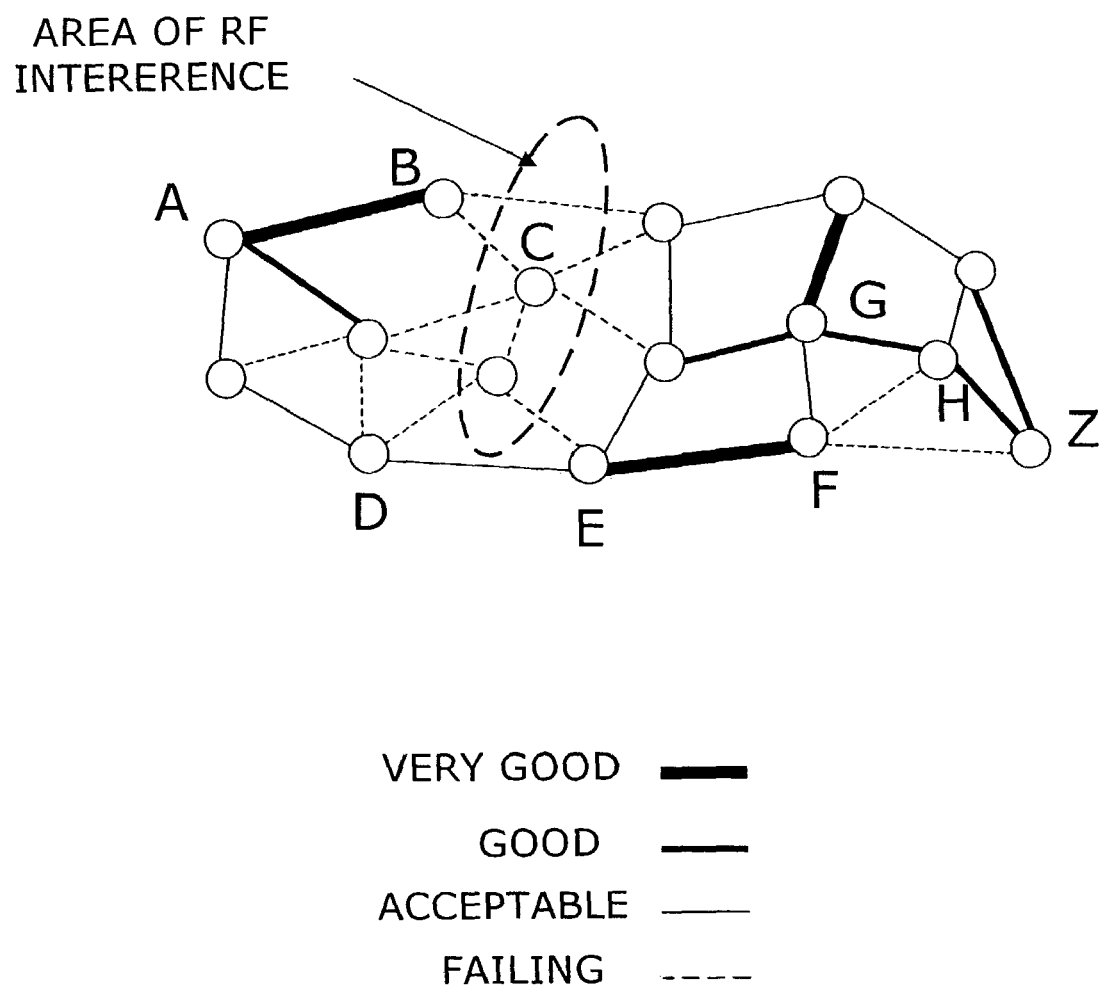
FIG. 3 illustrates how radio frequency (RF) interference can degrade the quality ratings associated with certain links in the data communications network depicted in FIGS. 1 and 2.

There are important exceptions to this general case, however, and FIG. 3 illustrates one such exception. In the example shown in FIG. 3, some or all of the links are configured to transmit data wirelessly, such as by radio or microwave signals. In this case, however, there is a source of interference across the network that is affecting a number of links that are spatially proximate. If the network shown in FIG. 3 uses a conventional link teardown system, each of the nodes connected to one of the affected links would notice that one of its links is failing and make an independent decision to tear down that link, i.e., remove it from active service, without regard for the decisions being made by neighboring nodes concerning other links in the vicinity of the interference. Thus, conventional systems, which basically check an individual link's quality and remove the link from service if the link quality shows that it is failing, would likely remove all of the links experiencing the interference from service, leaving only a single "acceptable" quality link (the link between nodes D and E in FIG. 3) to bear all traffic across the network. In fact, one can easily imagine cases in which ALL cross-wise links (including the link between nodes D and E in FIG. 3) are torn down, thereby partitioning the network into two different network segments that are incapable of communicating with each other.

The present invention addresses this problem by having each node in the network consider not only the quality rating of the failing network link when deciding whether to tear down a failing network link, but also the quality ratings and, preferably, the current statuses, of some or all of the other links in the network. With the present invention, link teardown decisions are based on more comprehensive information, such as the overall network state. Referring again to the network depicted in FIG. 3, each node attached to a failing link would consider information concerning the entire network topology, including the current quality ratings and statuses of each link in the network when deciding whether or not to tear down a link. Then the node might judge that the results would be very bad indeed if it tore down its failing links, and so determine that even though a given link is "failing" it should be kept in service, since on the whole it is better to keep this failing link in place than to remove it from the network.

Figure 4:
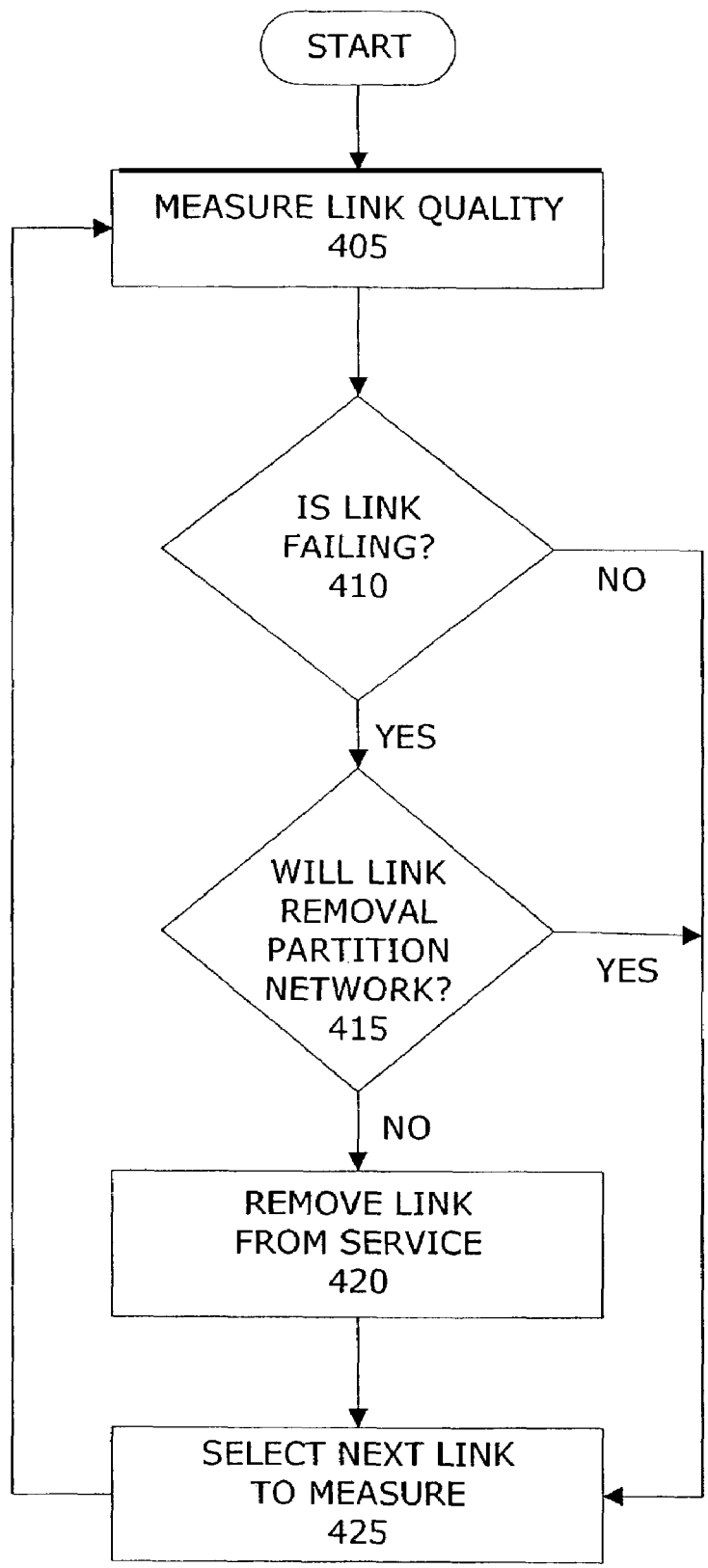
FIG. 4 contains a flow diagram illustrating the steps performed in one embodiment of the present invention to determine whether a network link should remain in service and, if not, to remove it from service.

A processor configured to operate in accordance with the present invention may execute a variety of algorithms to determine whether a failing network link should be taken out of service. FIG. 4 depicts a flow diagram illustrating the steps performed by a processor executing one such algorithm. In this example, the link teardown algorithm checks to see if removal of a selected failing link and other failing links will partition the network. First, as shown in step 405 of FIG. 4, the quality of a local network link is measured. Typically, the quality of a selected network link is determined by counting the number of "hello" messages successfully transmitted over the network link, the number of "hello" messages that fail to be transmitted by the network link, or the ratio of successfully transmitted messages to unsuccessfully transmitted messages.

In a preferred embodiment, a quality rating is assigned to the local network link, based on the results of the quality measurement, and is stored in a memory location, and/or data structure like the one described in detail below with reference to FIG. 6. The data structure can be accessed by the link teardown processor, and, preferably, is disseminated to other nodes and/or other processors coupled to the network so that those other nodes and processors can use the quality rating information to make their own link teardown decisions. Next, in step 410, a processor checks the quality rating to determine whether the selected network link is failing. As stated above, the network administrator may define what constitutes a "failing" network link in various ways, depending on the requirements of the data communications network and the link teardown processor. Thus, a failure threshold may be defined to comprise a specified minimum value for the link's congestion, speed, cost, security level, stability level, etc. For example, if the link is cryptographically protected, it could be important that the link is removed from service when the remaining encryption capacity for the link (measured, for example, as the number of additional bytes of data that can be encrypted, or, alternatively, the length of time that encryption can be applied before the current encryption key will be exhausted) falls below the specified value (indicating that the link is either currently unsecured or about to become unsecured). Thus, the test at step 410 of FIG. 4 may comprise comparing the current remaining encryption capacity for the link to the specified minimum threshold value.

If the network link is not failing, there will be no reason to remove it from service, and control passes to step 425, where the next link to measure is selected. On the other hand, if it is determined at step 410 that the network link is in fact failing (e.g., too slow, too congested, too costly, too unstable, unsecured, etc), then the processor next determines, at step 415, whether removing the failing network link will partition the network into separate segments. This is accomplished by accessing the quality ratings and/or statuses of other links in the immediate vicinity of the failing link or elsewhere in the data communications network, if necessary.

If removing the network link from service will partition the network, the selected network link will not be removed from service, and control, once again, will pass to step 425, where the next link is selected for measurement. But if the removal of the failing link will not partition the network, then it is okay to remove the link from service, which is accomplished at step 420. Whether the network will be partitioned is but one example of the criteria that could be used at step 415 of FIG. 4 to determine whether the selected network link should be removed. As stated above, the invention could also base the removal decision on factors such as the cost, speed, speed, security level or stability level of other links in the immediate vicinity of the failing link, or elsewhere in the network.

Although the algorithm represented by FIG. 4 measures link quality on each iteration, it will be understood by those skilled in the art that a system according to the present invention may alternatively be configured to make all the quality measurements for all links ahead of time, or with another processor dedicated to the task, thereby eliminating the need to perform step 405 every time through. If all the quality ratings have already been assigned and stored in the appropriate memory locations or databases, the processor simply needs to access the quality ratings and compare them against a specified failure threshold, as indicated in step 410 of FIG. 4.

Figure 5:
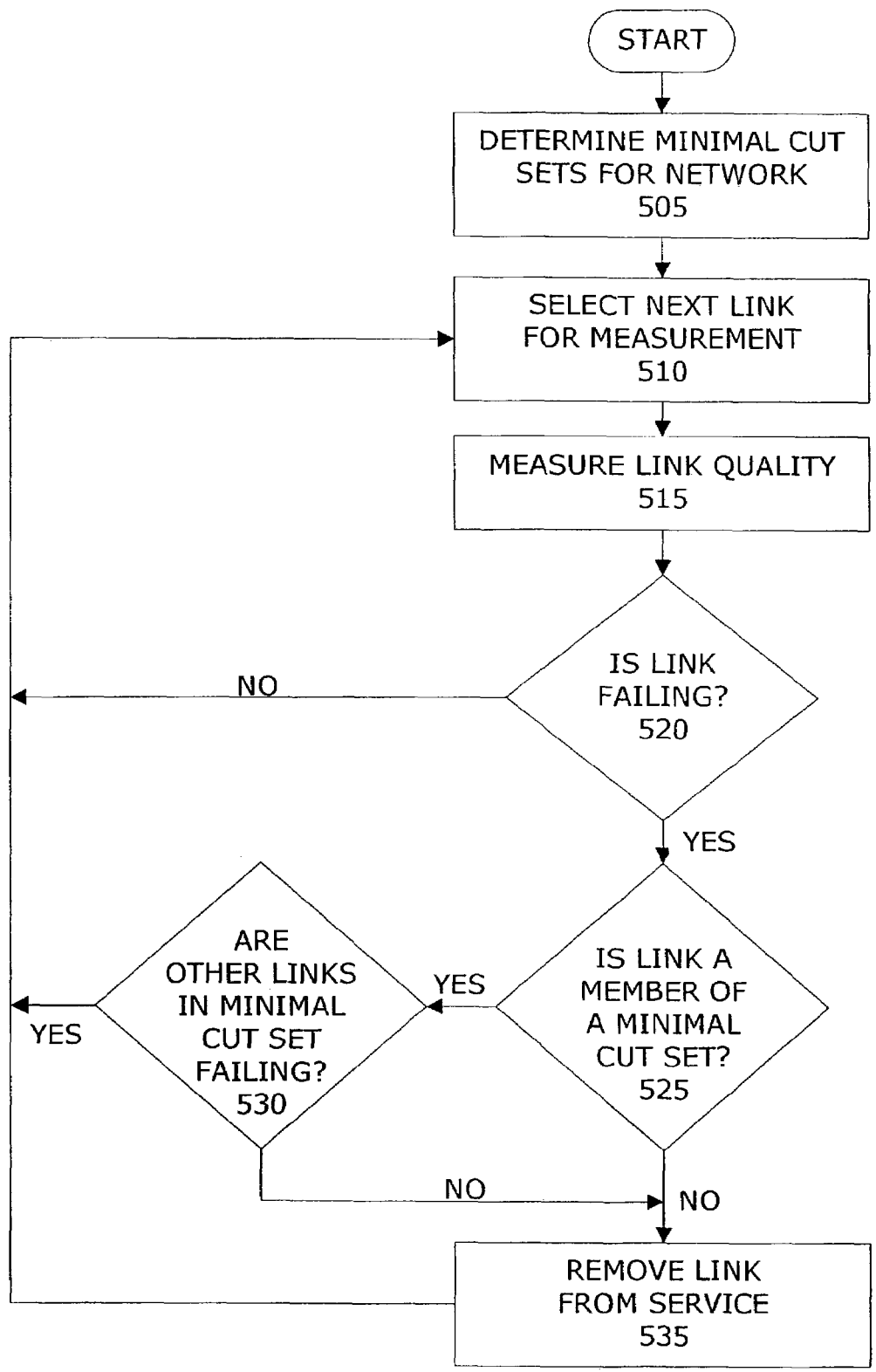
FIG. 5 contains a flow diagram illustrating the steps performed in another embodiment of the present invention to remove a failing network link. In this embodiment, information about whether the failing network link is a member of the minimal cut set is used to determine whether the failing link should be removed.

FIG. 5 depicts a flow diagram illustrating another example of the steps that might be performed by a link teardown processor configured to operate in accordance with the present invention. In this example, however, the link teardown algorithm checks to see if the failing link belongs to a minimal cut set for the network, and if all other links in that cut set are also failing. A "cut set" is a set of links that, if all removed together, would partition the network into separate segments. A minimal cut set is such a cut set with the smallest number of links, i.e., the smallest set of links that would have to be removed from the network together in order to partition it.

First, in step 505, the system determines which network links in the network make up a minimal cut set. The processor next selects a link and measures its quality, steps 510 and 515, in order to determine whether the network link is failing (step 520). If the link is not failing, there will be no need to remove it from service, and control returns to step 510 so that the next network link can be selected and tested. However, if it is determined at step 520 that the link is failing, the next step, step 525, is to determine whether the failing link is a member of a minimal cut set for the network. If the failing link is not a member of a minimal cut set, then control passes to step 535, where the link is removed from service. However, if the failing network link is a member of a minimal cut set, then the processor checks the quality ratings and statuses of the other network links in the minimal cut set to determine whether they are also failing, step 530. If the other links in the minimal cut set are also failing, then the selected link is not removed from service, and control passes once again to step 510, where the next link is selected for measurement. But if the other links in the minimal cut set are not failing, the selected network link is removed from service, step 535, and control passes to step 510 to begin processing the next link.

The flow diagrams of FIGS. 4 and 5 illustrate but two examples of algorithms suitable for implementing the present invention. One skilled in the art, upon reading this disclosure and practicing the claimed invention, would recognize that numerous variations and modifications may be made to these exemplary algorithms, and that such variations and modifications fall within the scope of the claimed invention.

In a preferred embodiment, quality rating and status information is propagated throughout the network so that other network routing devices that are performing network link teardown decisions can access it. With reference now to FIG. 6, a discussion of some of the techniques that could be used to propagate the quality ratings and status information will now be presented.

A data communications network configured to operate in accordance with the present invention may use a "link-state" routing protocol, or Open Shortest Path First (OSPF) protocol. OSPF is a routing protocol used within larger autonomous system networks to disseminate routing information to all routers in a network using a reliable flooding technique. Using OSPF, a host that obtains a change to a routing table or detects a change in the network immediately multicasts the changed information to all other nodes in the network so that all will have the same routing table information. An older routing protocol installed in many of today's corporate networks, called Routing Information Protocol (RIP), which multicasts the entire routing table to all other nodes in the network, not just the information that has changed, could also be adapted to work with the present invention. OSPF multicasts only the updated information, and only when a change has taken place.

The present invention improves the OSPF technique by adding a new field to the conventional link state routing update messages, namely, a quality rating field, for each link in the network. FIG. 6 shows an example of a data structure for a routing update message containing these new fields, which are designated Qual Rating (AB) 635, Qual Rating (AC) 650 and Qual Rating (AN) 665, in FIG. 6, since the fields indicate the quality of links connecting node A to node B, connecting node A to node C, and connecting node A to node N, as advertised by node A. Note that, in a preferred embodiment, these quality fields contain a numeric representation of the teardown quality, which are depicted graphically in FIG. 2. In other words, a quality rating value of 0 might stand for "failing," a value of 1 might stand for "acceptable," and so forth.

Figure 6:
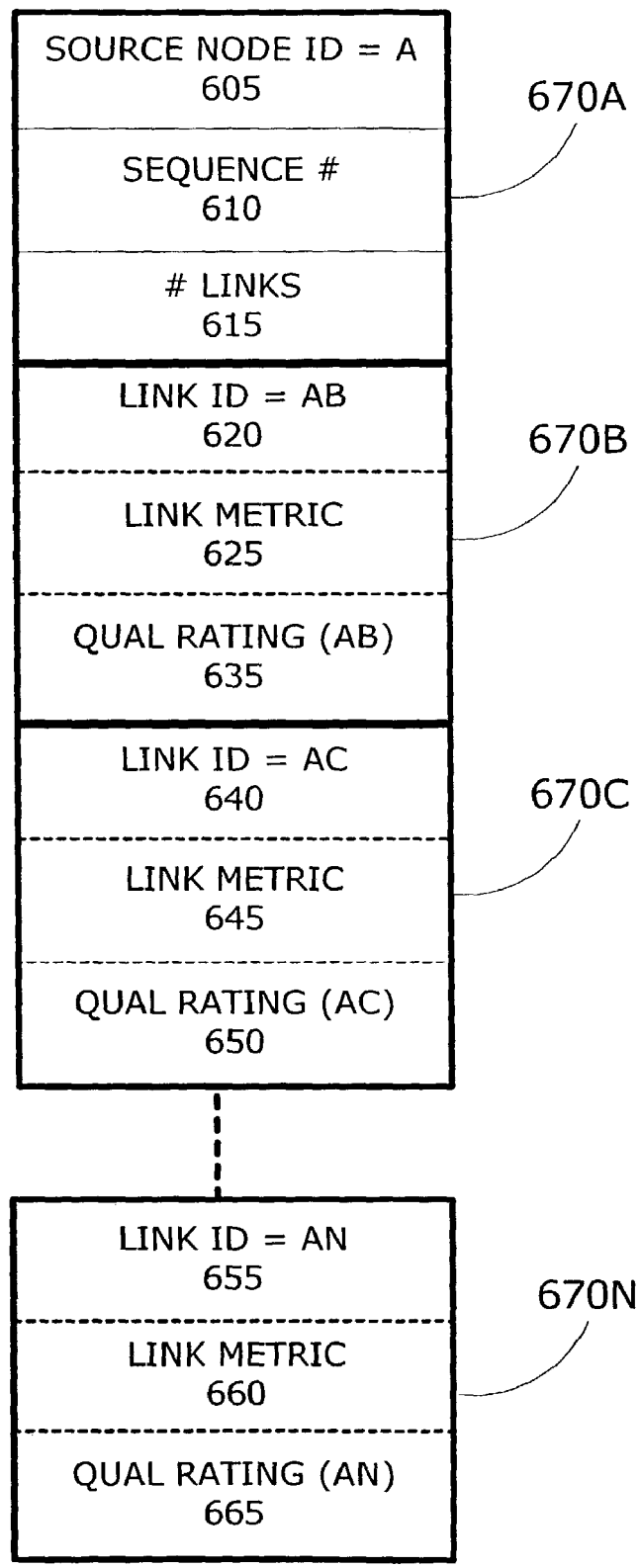
FIG. 6 shows one example of a data structure for a routing update message suitable for use with embodiments of the present invention to disseminate information about the current quality ratings of links in the data communications network.

As illustrated by FIG. 6, the data structure of the update message comprises a header packet (designated 670A in FIG. 6), which contains: a Source Node ID field 605, which identifies the node or host computer broadcasting the update message; a Sequence No. field 610, which identifies the sequence number of the update message; and a Link Counter field 615, which indicates to the node receiving the message how many links are attached to the node broadcasting the update message, and thus the number of link information packets that will follow. Typically, the node broadcasting the update message will provide one link information packet (comprising, for example, a link identifier, a link metric and a quality rating) for each link attached to the node broadcasting the update message. In FIG. 6, for example, link information packet 670B contains Link ID 620, Link Metric 625 and Qual Rating (AB) 635, which contain a link identifier and updated link metric and quality rating information for the link connecting nodes A and B. Similarly, link information packet 670C contains Link ID 640, Link Metric 645 and Qual Rating (AC) 650, which contain a link teardown identifier, and updated link metric and quality rating information for the link between nodes A and C, and so on. The last link information packet in the update message, designated 670N in FIG. 6, contains Link ID 655, Link Metric 660 and Qual Rating (AN) 665, which contain a link identifier and updated link metric and quality rating information for the link between nodes A and N. Depending on the requirements of the data communications network, the data structure for the update message may contain other fields that may be useful for managing links in the network, not shown in FIG. 6, without departing from the scope of invention.

When a network routing device, such as a router or switch, receives a message containing the new quality rating fields, it should install its contents into its conventional link-state routing database, but augmented by the additional fields that contain link quality information for each link. Thus, each node or host computer in the network may have a computer-readable storage medium, preferably encoded with a database configured to hold the data structure containing the update message fields. This database can then be consulted when the processor executes the link teardown algorithms, since it now contains information about the link quality of some or all other links in the network (as received in routing updates from other network routing devices in the network).

A network routing device configured to operate in accordance with the present invention may be configured to advertise new link quality rating values for one or more links periodically at specified time intervals or, alternatively, every time a quality rating value changes. The network routing device may also be programmed to maintain a weighted, time-series average of recent link quality measurements and transmit this moving average to other nodes in the network, instead of sending instantaneous "snapshot" measurements.

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and appended claims.

What is claimed is:

1. In a data communications network having a set of network links, a method of removing network links from service, comprising:

providing a group of quality ratings, each quality rating in the group of quality ratings being associated with a network link in a subset of the set of network links; and removing an individual network link from service based on both a quality rating associated with the individual network link and a status associated with at least one other network link in the subset of network links; and wherein the status associated with each network link in the subset of network links comprises a quality rating associated with each network link in the subset of network links, the quality rating associated with each network link in the subset of network links is obtained by measuring the data transmission performance of each network link in the subset of network links, and the data transmission performance of each network link comprises a value representing a number of data transmissions successfully delivered by the network link in a specified period of time.

2. In a data communications network having a set of network links, a method of removing network links from service, comprising:

providing a group of quality ratings, each quality rating in the group of quality ratings being associated with a network link in a subset of the set of network links; and removing an individual network link from service based on both a quality rating associated with the individual network link and a status associated with at least one other network link in the subset of network links; and wherein the status associated with each network link in the subset of network links comprises a value indicating whether the network link is connected to a specified node in the data communications network.

3. In a data communications network having a set of network links, a method of removing network links from service, comprising:

providing a group of quality ratings, wherein each quality rating in the group is associated with a network link in a subset of the set of network links;

comparing a quality rating associated with each network link in the subset of network links to a specified threshold;

determining a minimal cut set for the data communications network, wherein the minimal cut set comprises the smallest number of network links in the subset of network links, which if removed from the data communications network, would partition the data communications network;

determining whether the individual network link is a member of the minimal cut set; and removing an individual network link from service if the quality rating associated with the individual network link is less than the specified threshold, and the quality rating associated with at least one other network link in the minimal cut set of network links is greater than the specified threshold.

4. The method of claim 3, wherein the set of network links and the subset of network links are the same.

5. The method of claim 3, wherein the data communications network comprises a wireless network.

6. The method of claim 3, wherein the data communications network comprises a fiber optic network.

7. The method of claim 3, wherein the data communications network comprises an internet protocol-based network.

8. The method of claim 3, wherein the data communications network comprises a cryptographically-protected network.

* * * * *